Figure 1:
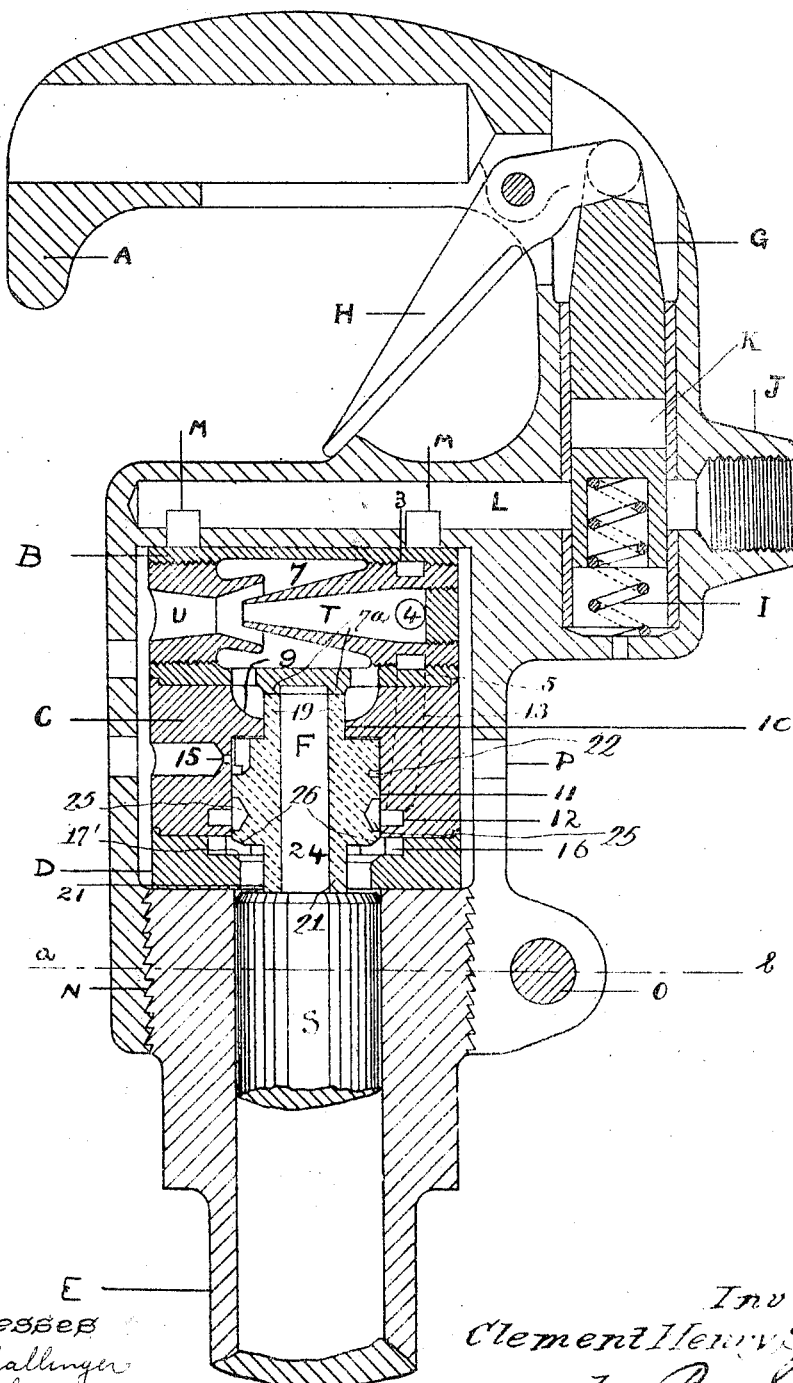

C. H. STEVENS.
PNEUMATIC HAND HAMMER.
APPLICATION FILED JULY 8, 1909.

1,030,212.

Patented June 18, 1912.

7 SHEETS—SHEET 2.

Witnesses
E. Schallinger
E. Jacobs

Inventor
Clement Henry Stevens
by J. Singer
Att'y

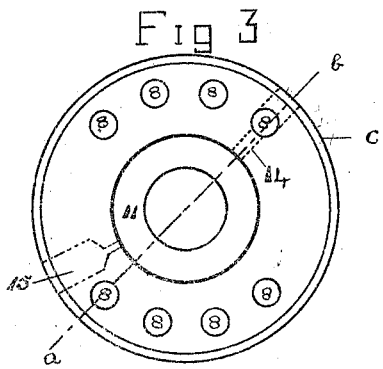
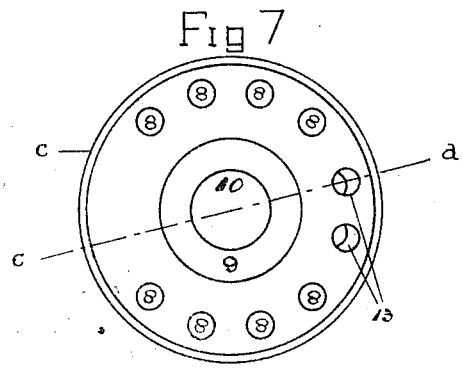
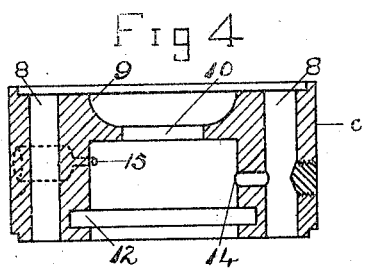
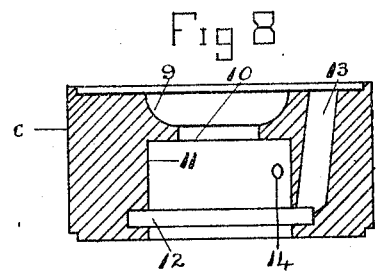
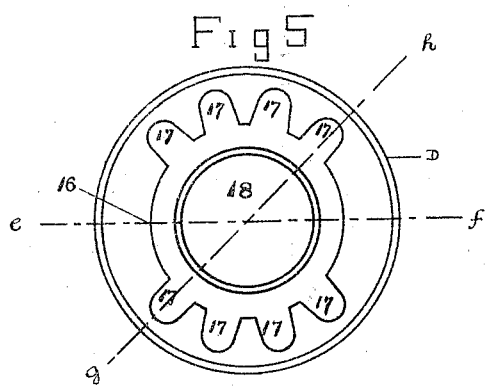
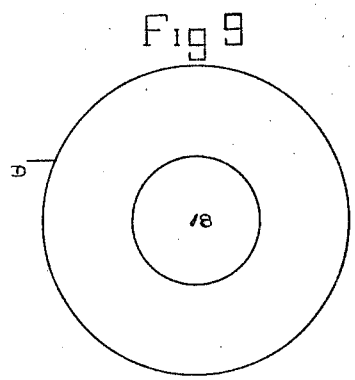
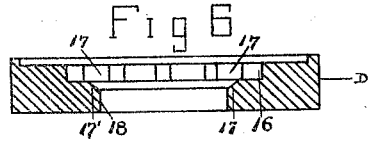
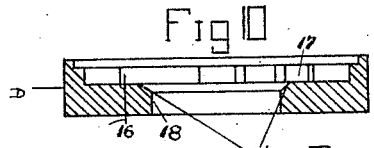

C. H. STEVENS.
PNEUMATIC HAND HAMMER.
APPLICATION FILED JULY 8, 1909.
1,030,212.
Patented June 18, 1912.
7 SHEETS—SHEET 4.
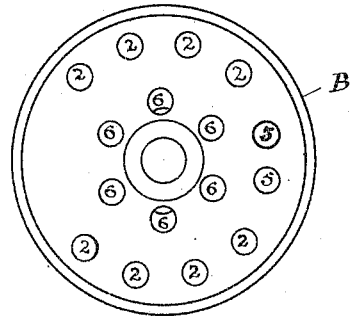
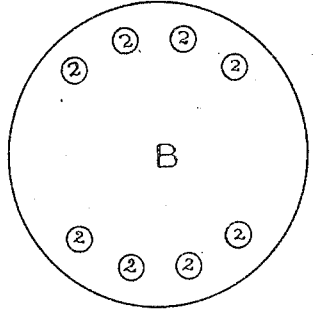
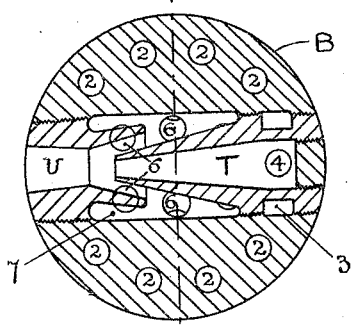
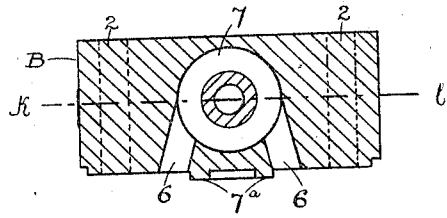
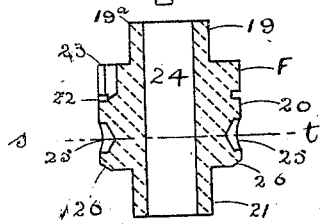
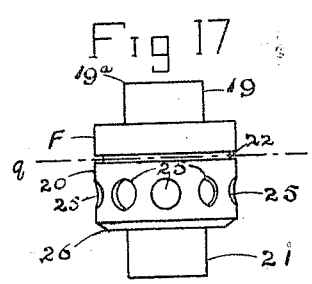
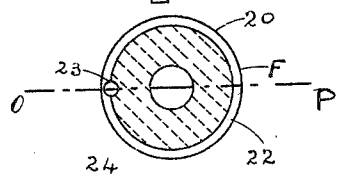
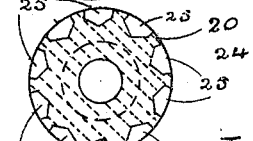
Witnesses
E. Schallinger
E. Jacobs
Inventor
Clement Henry Stevens
by J. Singer

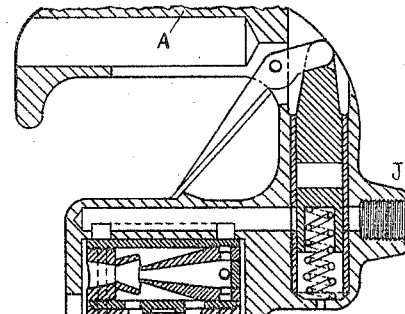
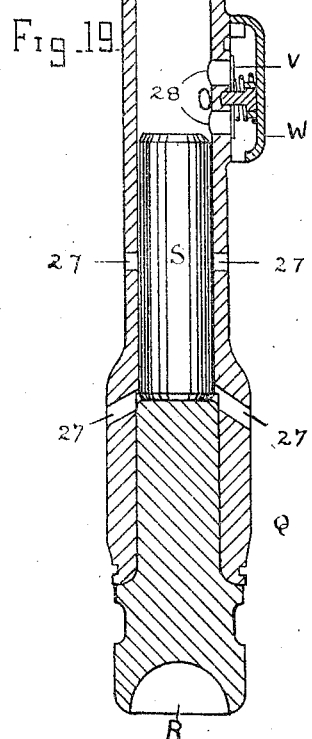
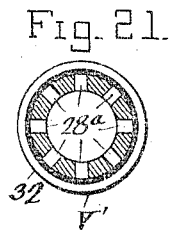
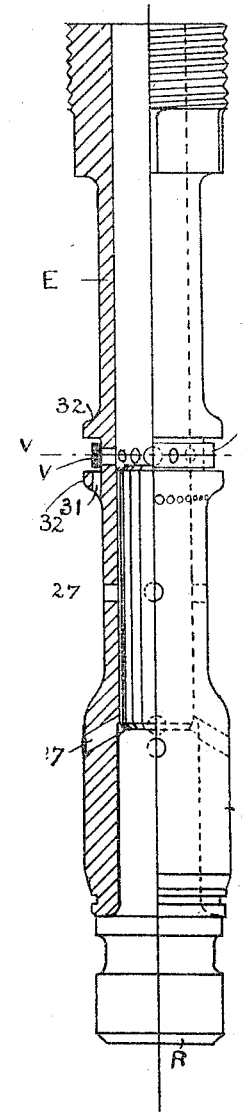
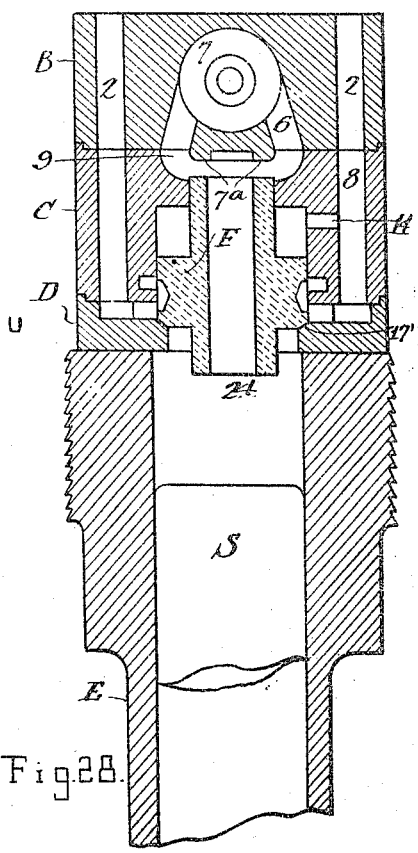

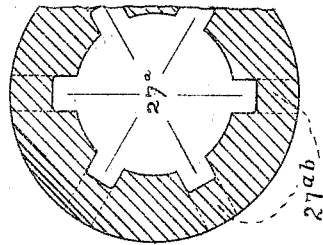
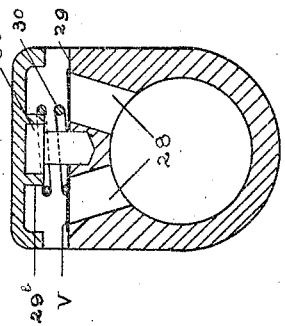
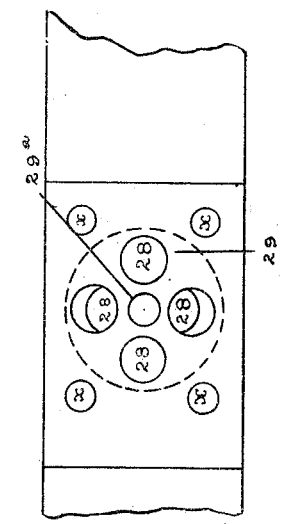
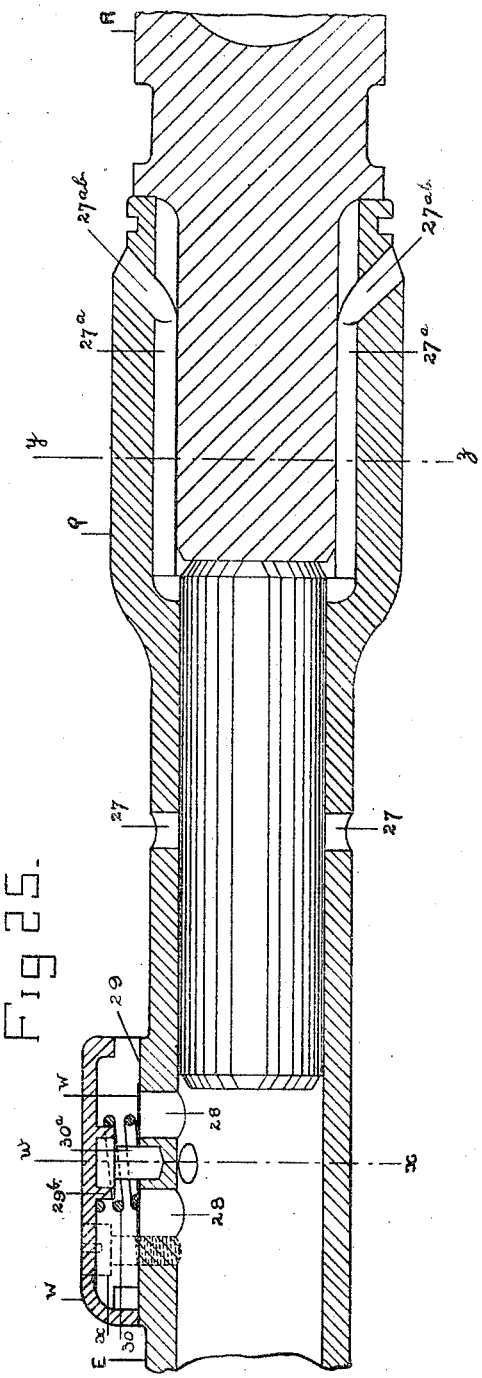

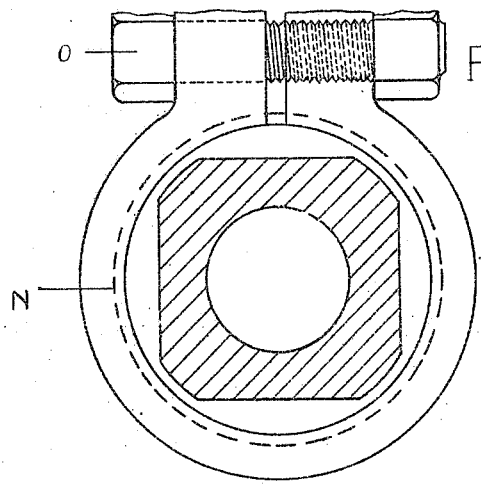
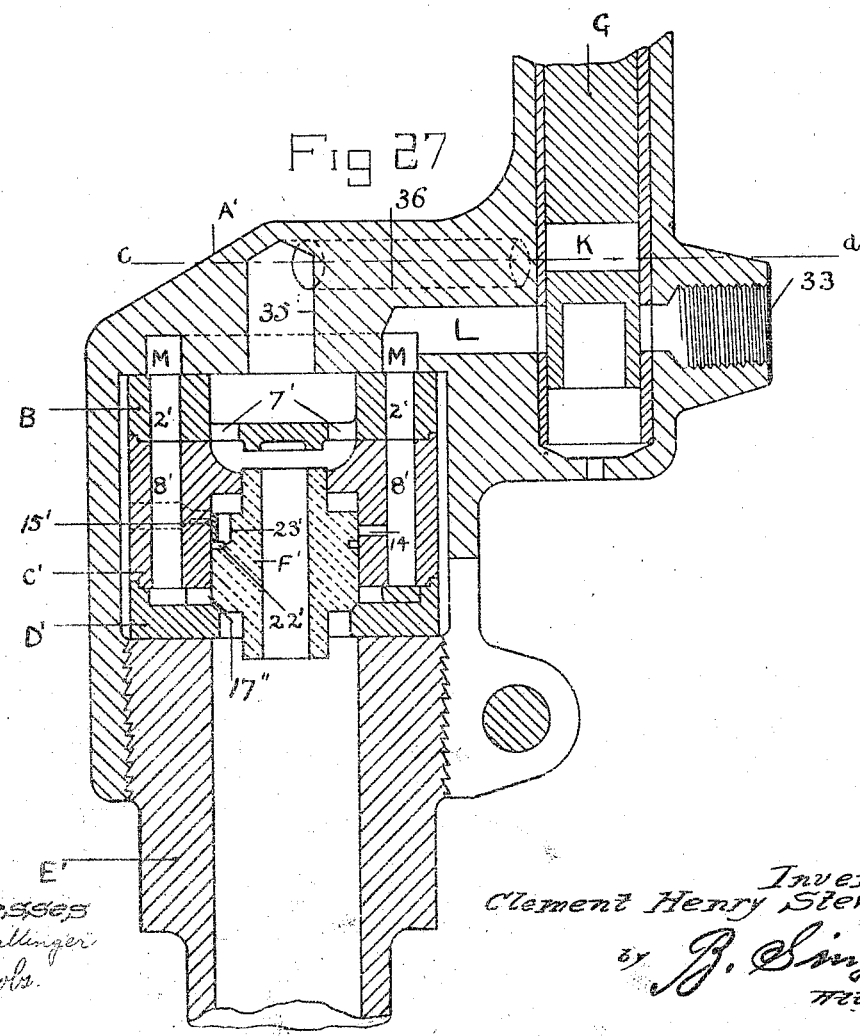

UNITED STATES PATENT OFFICE.

CLEMENT HENRY STEVENS, OF LAS PALMAS, GRAN CANARIA, CANARY ISLANDS.

PNEUMATIC HAND-HAMMER.

1,030,312.     Specification of Letters Patent.     Patented June 18, 1912.

Application filed July 8, 1909. Serial No. 508,888.

*To all whom it may concern:*

Be it known that I, CLEMENT HENRY STEVENS, a subject of the King of Great Britain, of Las Palmas, Gran Canaria, Canary Islands, engineer, have invented a new and useful Improvement in Pneumatic Hand-Hammers, of which the following is a specification.

This invention relates to pneumatic tools of that class in which the power actuated piston is caused to be retracted after imparting the impact of its blow by means of a vacuum created or applied at the upper or handle end of the tool, and it has more particular reference to the means employed for utilizing said vacuum to cause the return stroke of pneumatic hand hammers for riveting, chipping, calking, and such like work.

The object of my invention is the provision of a hand hammer, of the type referred to, which is simple in construction, lighter in weight, and of greater power than hammers of like size as constructed heretofore.

With the foregoing object in view, my improvements essentially consist in the use of an exhausting air jet ejector in the admission valve situated in the upper or handle end of the tool for the purpose of creating a vacuum or partial vacuum on the upper end of the piston to cause the return stroke of said piston after the blow has been struck. This vacuum I may alternatively produce at the correct time by means of a suitable connection with a chamber containing a steadily maintained vacuum situated at a distance from the hammer or hammers. By this means only atmospheric pressure comes in contact with the lower or tool end of the piston, and further I can dispense with any air passages for high pressure air or exhaust along the barrel and parallel with it, thus allowing a very thin tube to be used and so reducing the weight.

The invention consists essentially in the general construction, arrangement and combination of parts hereinafter fully described and the novel features whereof are particularly pointed out by the appended claims.

The accompanying drawings are in illustration of one convenient form of pneumatic hand-hammer embodying the present improvements.

Like letters and reference numerals designate the same or similar parts in the several sheets of the accompanying drawings.

Figure 2:
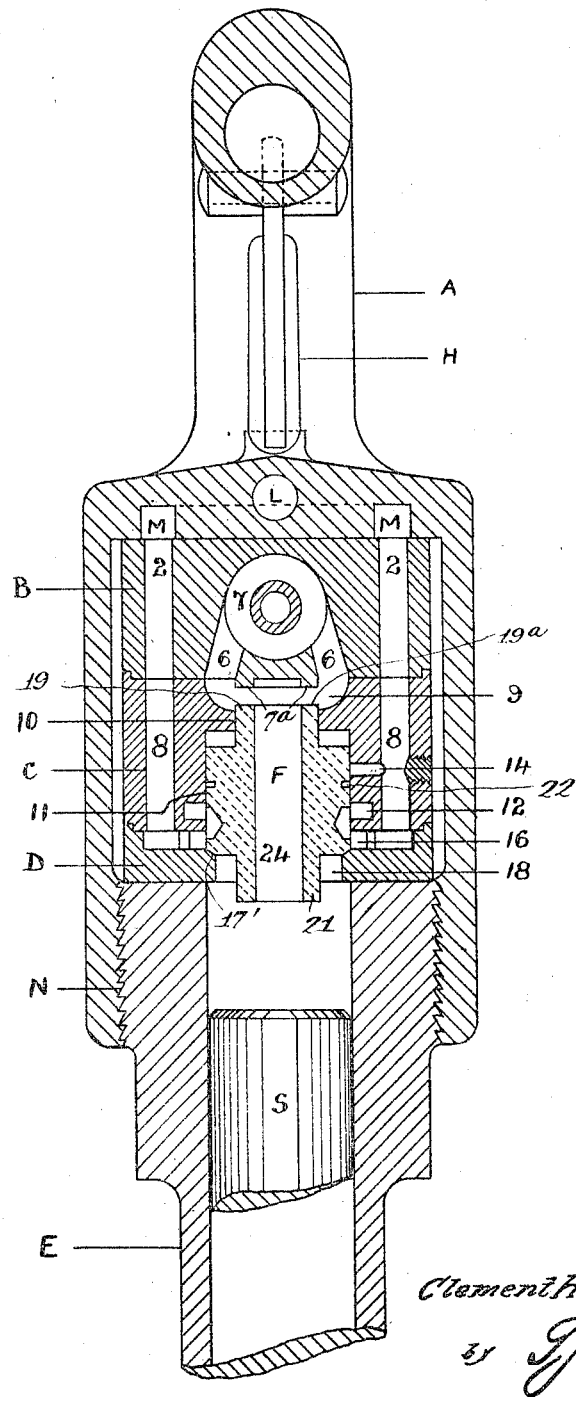

Figure 1 is a sectional elevation through the upper or handle end of a pneumatic hammer embodying my improvements. Fig. 2 is a cross sectional elevation through the handle end of the hammer taken at right angles to Fig. 1. Fig. 3 is a bottom plan of the center part of the valve box. Fig. 4 is a cross sectional elevation of the center part of the valve box through the line $a$—$b$, Fig. 3. Fig. 5 is a top plan of the lower part of the valve box. Fig. 6 is a sectional elevation taken on the line $e$—$f$ in Fig. 5 of the lower part of the valve box. Fig. 7 is a top plan of the center part of the valve box. Fig. 8 is a cross sectional elevation of the center part of the valve box through line $c$—$d$, Fig. 7. Fig. 9 is a bottom plan of the lower part of the valve box. Fig. 10 is a sectional elevation on the line $g$—$h$ in Fig. 5 of the lower part of the valve box. Fig. 11 is a bottom plan of the top part of the valve box. Fig. 12 is a cross section through the top part of the valve box on the line $k$—$l$ in Fig. 16. Fig. 13 is a sectional elevation of the valve through the line $o$—$p$ in Fig. 14. Fig. 14 is a cross section of the valve taken on the line $q$—$r$ in Fig. 17. Fig. 15 is a top plan of the top part of the valve box. Fig. 16 is a sectional elevation of the top part of the valve box taken on the line $m$—$n$ in Fig. 12. Fig. 17 is an elevation of the valve. Fig. 18 is a cross section of the valve through the line $s$—$t$ in Fig. 13. Fig. 19 is a longitudinal section of the complete hammer. Fig. 20 is a half elevation and longitudinal section of a modified form of relief valve and the piston barrel. Fig. 21 is a cross section of the relief valve and barrel taken on the line $u$—$v$ in Fig. 20. Fig. 22 is a cross section of the flat relief valve taken on the line $w$—$x$ in Fig. 25. Fig. 23 is a plan of the flat relief valve seat. Fig. 24 is a cross section of the bottom end of the barrel taken on the line $y$—$z$ in Fig. 25. Fig. 25 is a longitudinal section of the flat relief valve and part of barrel. Fig. 26 is a cross section of the handle and barrel taken on the line $a$—$b$ in Fig. 1. Fig. 27 is a sectional elevation of the alternative vacuum arrangement taken through the handle end of the hammer. Fig. 28 is a sectional elevation through a slightly modified form of the distributing valve.

For the purpose of description the hammer is supposed to be standing vertically with the handle upward.

Referring to Figs. 1 and 2 it will be seen that the hammer consists of a handle A, of ordinary type containing an admission valve G, Figs. 1, 27, actuated by a trigger H and held up in the closed position by a spring I. The compressed air enters by the screwed nipple J passes through the hole K when the admission valve is depressed and enters into the air hole L which communicates with the annular space M, turned in the top of the cylindrical portion. This brings the compressed air to the top part of the valve box B, Figs. 1, 2, 11, 12, 15, 16.

The valve box consists of three parts, namely, upper part B, Figs. 1, 2, 11, 12, 15, 16, center part C, Figs. 1, 2, 3, 4, 7, 8, and lower part D, Figs. 1, 2, 5, 6, 9, 10. This valve box contains a distributing valve F, Figs. 1, 2, 13, 14, 17, 18.

The valve box B, C, D, is seated on top of the barrel E, Figs. 1, 2, 19, and held in position by the lower portion of the handle A being screwed on to the end of the barrel E, the threads of the screw being shown in section at N, Figs. 1, 2. After the handle is screwed hard down it is locked in position by the bolt O, Fig. 1. To allow the bolt O to lock the thread N the handle is split up to P, Fig. 1, so that the diameter of the thread N may be reduced by tightening the bolt O. This device is common in many machines and is notably used for gripping the carrying rod of a bicycle saddle or the loose headstock of a lathe. A horizontal cross section showing the bolt O and thread N is shown in Fig. 26.

The barrel E consists of a thin tube with a screwed portion N at the top end, a relief valve V, Fig. 19 or V', Fig. 20, about the middle, and a swelled portion at the lower end Q, Figs. 19, 20, into which the tool R, Figs. 19, 20, is inserted, in this case a snap is shown for riveting. A piston S, shown broken off in Figs. 1 and 2, and entire in Figs. 19, 20, works up and down in the barrel E, Figs. 1, 2, 19, 20, 28, and is a good fit therein.

The upper part B of the valve box, Figs. 1, 2, 11, 12, 15, 16, contains an air ejector nozzle T, Figs. 1, 12, and an ejector discharge U, Figs. 1, 12. This air ejector T, U, is for the purpose of creating a vacuum above the piston S in the barrel E. Compressed air holes 2, Figs. 2, 11, 12, 15, 16, in this case eight in number, pass right through the part B, communicating at their top ends with the annular space M, M, Figs. 1, 2. The nozzle T is screwed into position, having a groove, 3, Figs. 1, 12, turned out of the threading and having holes 4, Figs. 1, 12, drilled through to the center of the nozzle, holes, 5, 5, Fig. 11, bored from the lower side of B into groove 3, for conveying compressed air to the nozzle from holes 13 in the center part C of the valve box, Figs. 7, 8, (afterward to be referred to). Eduction holes 6, Figs. 2, 11, 12, 16, in this case six in number, communicate from the lower side of the part B into the nozzle chamber 7, Figs. 1, 2, 12, 16. The ejector discharge U, Figs. 1, 12, is screwed into the part B from the opposite side to the nozzle T and in line with it.

The center part of the valve box C, Figs. 1, 2, 3, 4, 7, 8, contains the working chamber of the valve F, Figs. 1, 2, 13, 14, 17, 18. Eight compressed air holes 8, Figs. 2, 3, 4, 7, 8, pass right through the part C, and correspond at their upper ends with the holes 2 in the part B, Figs. 2, 11, 12, 15, 16. A cup-shaped hollow 9, Figs. 1, 2, 4, 7, 8 is turned out of the top of the part C and corresponds with the eduction holes 6 in the lower side of the upper part B. A cylindrical hole 10, Figs. 1, 2, 3, 4, 7, 8, is for the upper end of the valve F to work in. A large cylindrical hole 11, Figs. 1, 2, 3, 4, 8, is for the body of the valve F to work in. A groove 12, Figs. 1, 2, 4, 8, is for conveyance of compressed air to the ejector nozzle. Two holes 13, 13, Figs. 7, 8, are drilled from the top part of C at a slight inclination and enter the groove 12 and are for conveyance of compressed air from groove 12 to holes 5, 5, in the lower part of part B, Fig. 11, which communicates with the ejector nozzle. A small hole 14, Figs. 2, 3, 4, 8, allows compressed air to enter from one of the holes 8, Figs. 2, 3, 4, 7, into the valve chamber 11. Another small hole 15, Figs. 1, 3, 4, allows air to enter the cylindrical valve hole 11.

The lower part of the valve box D, Figs. 1, 2, 5, 6, 9, 10 has in its upper face a groove or recess 16 to communicate compressed air to the barrel F to drive the piston S down by way of the hole 18, Figs. 2, 5, 6, 9, 10. Eight U-shaped cuts 17, Figs. 5, 6, 10, of the same depth as the groove or recess 16 correspond with the lower ends of the holes 8, Figs. 3, 4, 7, in the center part C and are for the purpose of communicating compressed air from these holes 8 into the groove or recess 16, Figs. 1, 2, 5, 6, 10. A miter seat 17', Figs. 6, 10, is for seating the distributing valve F, and a hole 18, Figs. 5, 6, 9, 10, is for effecting communication between the valve chambers 10, 11, Figs. 4–8 and the barrel E.

The distributing valve F, Figs. 1, 2, 13, 14, 17, 18, has an upper portion of small diameter 19, Figs. 13, 17, to work in the cylindrical hole 10, Figs. 4, 8, in the center part C, with a flat seating 19ª, Figs. 13, 17, on the top to sit against the seating 7ª in the part B, Figs. 11, 16, a larger diameter portion or main body 20, Figs. 13, 14, 17, 18, to work in the cylindrical chamber 11, Figs. 3, 4, 8, in the center part C, and a smaller diameter and lower portion 21, Figs. 1, 13, 17, to pass into the top of the barrel E. A groove 22, Figs. 13, 14, 17, is cut all around the body of the valve and has a small hole 23, Figs. 13, 14, which communicates from the top of the main body of valve 20, Figs. 13, 14, 17, 18, into the groove 22, Figs. 13, 14, 17. A large hole 24, Figs. 1, 2, 13, 14, 18, traverses the valve from top to bottom through the center and forms the eduction passage of air from the barrel E. A series of shallow round holes 25, Figs. 13, 17, 18, are spaced around the main body of the valve below the groove 22, Figs. 13, 17, and have for object to make communication between the groove or recess 16 in the lower part of valve box D, Fig. 5, 6, 10, and the groove 12 in the center part of valve box C, Figs. 4, 8. A miter edge 26, Figs. 13, 17, is for seating on the miter seat 17′, Figs. 6, 10, in the lower part of valve box D.

The relief valve V, Figs. 19, 25, or V′, Figs. 20, 21, on the barrel E may be any form of non-return valve, preferably a thin sheet of steel as at V, Figs. 19, 25, sliding up and down and guided by a pin 30ª, Figs. 22, 25. Said pin passes through the center of the valve and is inserted into the valve seat 29, Fig. 22, in the small hole 29ª drilled to receive it at its bottom end and, said pin is held at its top end in a recessed boss 29ᵇ, Fig. 25, formed in the under part of the guard or cover W, Figs. 19, 25. The valve is held in its place against the seat 29, Figs. 19, 25, by a light spring 30, Figs. 22, 25, and covers the relief holes 28, Figs. 19, 25, the whole being covered by a hand guard W, Figs. 19, 25, held in position by four screws X, Figs. 23, 25, in order to keep the operator's hand from interfering with the working of the valve. Another efficient valve is also shown in Figs. 20 and 21, the valve V′ being a stout rubber ring surrounding a series of holes 28ª, Figs. 20, 21, and closing lightly on them by means of its elasticity as its internal diameter is slightly smaller than the external diameter of the barrel. Two guard collars 32, Figs. 20, 21, keep the rubber ring in position.

The atmospheric communication holes may be drilled through the barrel between the piston and snap or tool as at 27, Figs. 19, 20, or they may be grooves cut parallel to the barrel as at 27ª, Figs. 24, 25, and communicated to the atmosphere by diagonal holes as at 27ᵃᵇ, Figs. 24, 25.

For the purpose of describing the action, the hammer is supposed to be in a vertical position with the handle end upward. In the vertical position stated above both the valve F, Figs. 1, 2, 13, 14, 17, 18, and the piston S have fallen by gravity to their lowest positions, that is to say, the valve F rests upon the miter seat 17′, Figs. 6, 10, and the piston S rests against the tool R, Figs. 19, 20.

The action of the hammer is as follows:—A hose conveying high pressure compressed air is united to the screwed nipple J. The tool R is held firmly against the work to be done, the trigger H is then raised and the admission valve G depressed until the hole K therein comes opposite the hole L which permits the high pressure air to enter into the annular space M M, thence it travels downward through the holes 2, Figs. 11, 12, 15, 16, passes through the holes 8, Figs. 3, 4, 7, and enters the groove 16, Figs. 5, 6, 10. The valve F being seated on the miter seat 17′, Figs. 6, 10, the high pressure air cannot pass into the barrel E, Figs. 1, 2, so that it then passes from the groove 16, Figs. 5, 6, 10, upward into the holes 25, Figs. 13, 17, 18, of the valve F into the groove 12, Figs. 4, 8, and from there upward through the holes 13, Figs. 7, 8, into the groove 3, Figs. 1, 12, around the nozzle T, Figs. 1, 12, and here the high pressure air, in blowing through the ejector nozzle T and passing out through the ejector discharge U, Figs. 1, 12, induces a vacuum in the nozzle chamber 7, Figs. 1, 2, 12, 16. The vacuum thus created draws the air out of the barrel E by way of the large hole 24, Figs. 13, 14, 18, in the center of the valve F, Figs. 1, 2, 13, 14, 17, 18, the cup shaped hollow 9, Figs. 1, 3, 4, 8, and the holes 6, Figs. 11, 12, 16, and thereby induces a vacuum in the barrel E above the piston S. Atmospheric pressure air entering by the holes 27, Figs. 19, 20, or grooves and holes 27ª, 27ᵃᵇ, Figs. 24, 25, between the piston S and the tool R, Figs. 19, 20, 28, forces the piston S upward until it comes in contact with the lower part 21, Figs. 13, 17, of the valve F and by so doing raises the valve F until its top portion 19, Figs. 13, 17, with seating 19ª, Figs. 13, 17, seats against the seating 7ª, Figs. 11, 16. The valve F and the piston S are now in their highest positions as shown in Fig. 1. The compressed air cannot now pass through from the groove 16, Figs. 6, 10, by the shallow holes 25, Figs. 13, 17, 18, around the main body of the distributing valve as these holes 25 have been raised too high to communicate with the groove 16, Figs. 6, 10; it consequently passes between the miter seatings 26, Figs. 13, 17, and 17′, Figs. 6, 10, into the barrel E above the piston S driving it down against the tool R, Figs. 19, 20. This constitutes the striking action of the hammer. It will here be observed that the small groove 22, Figs. 13, 14, 17, around the valve F has come into communication with the small hole 14, Figs. 3, 4, 8, and that as this hole conveys high pressure air from one of the holes 8, Figs. 3, 4, 7, this air passes around the small groove 22, Figs. 13, 14, 17, and thence upward through the small hole 23, Figs. 13, 14, into the space above the valve in the valve chamber 11, Figs. 3, 4, 8. From here the air cannot escape and consequently presses on the valve F in a downward direction. The piston S having passed the flat relief valve V, Figs. 19, 25, or the rubber relief valve V', Figs. 20, 21 (as the case may be according to which type of valve is adopted), the high pressure air which has driven the piston S downward is suddenly released through the flat relief valve holes 28, Figs. 19, 25, or the rubber relief valve holes 28ª, Figs. 20, 21, (according to which type of valve is adopted) with the result that there is a reduction in pressure in the barrel E above the piston S and below the valve F. The full pressure is, however, maintained above the valve F in the valve chamber 11, Figs. 3, 4, 8, by communication through the hole 14, Figs. 3, 4, 8, as before stated, with the result that the valve F is driven downward until the miter seats 26, Figs. 13, 17, and 17', Figs. 6 and 10, meet. This brings the ejector again into action, the vacuum is formed and the piston raised for another stroke. As soon as the ejector starts work the vacuum is induced and the flat relief valve V, Figs. 19, 25, is held against its seat 29, Figs. 22, 25, by atmospheric pressure aided by the springs 30, Figs. 22, 25, or, the rubber relief valve V', Figs. 20, 21, is held against the relief holes 28ª, Figs. 20, 21, aided by its own elasticity, according to which type of relief valve is adopted. The relief valve V or V' (as the case may be) being thus closed, it prevents atmospheric air from entering above the piston S, so permitting the ejector to induce the necessary vacuum in the barrel E, as before explained. This cycle is rapidly repeated as long as the trigger H is held up.

It should be particularly noticed that when the valve F is in its bottom position, that is to say, when seated on the miter seat 17', Figs. 6, 10, the groove 22, Figs. 13, 14, 17, has passed below the hole 14, Figs. 4, 8, and the compressed air which drove the valve downward can now escape by the hole 15, Figs. 3 and 4, into the atmosphere. This device is to insure having as little resistance as possible to the raising of the valve F when the piston strikes it upward. This hole 15, Figs. 3, 4, is covered by the top edge of the main body of the valve F as soon as it has traveled upward a short distance. Also it must be observed that when the valve F is in the highest position, with the seatings 19ª, Figs 13, 17 and 7ª, Figs. 11, 16, touching, the high pressure air cannot pass up from the barrel E through the hole 24, Fig. 13, into the nozzle chamber 7, Figs. 12, 16.

The action of the flat relief valve V, Figs. 19, 25, 28, is that of a non-return valve aided by a steel spring 30, Figs. 22, 25, which holds it lightly against its seat 29, Figs. 22, 25. The action of the rubber ring relief valve V', Figs. 20, 21, is also that of a non-return valve aided by its own elasticity which makes it always grip over the barrel E owing to its being smaller in diameter than the barrel and being stretched thereon.

When the high pressure air presses through the holes 28ª, Figs. 20, 21, it expands the rubber ring valve V' and escapes all around and through a number of holes 31, Fig. 20. The guard collars 32, Figs. 20, 21, are intended to keep the rubber ring V' in position over the holes 28ª, Figs. 20, 21, and these guard collars also serve to prevent the hand of the operator from interfering with the working of the rubber ring.

What I claim as my invention and desire to secure by Letters Patent, is:—

1. The barrel portion provided with a threaded part at one end, an enlargement at the other end, atmospheric communicating apertures in the lower half of said barrel, relief holes mid-way of the length of said barrel, and a relief valve controlling said relief aperture, substantially as shown and for the purpose specified.

2. A relief valve comprising a valve seat portion and a movable thin sheet of metal, a guiding pin passing through said metal sheet and inserted into the valve seat portion, and a light spring holding said metal sheet in place against the seat portion, substantially as shown and for the purpose specified.

3. A pneumatic hammer comprising in combination, a cylinder provided with a bore, a piston in said bore, a cap on said cylinder having admission ports, a valve in said cap communicating with said bore and comprising a plurality of juxtaposed sections having ports communicating with said cap admission ports and with said bore, an ejector in said box, and a distributing valve in said box controlling admission from said box ports to said bore and ejector and projecting into the path of said piston for actuation thereby in one direction, said valve having a port for communication with one of said box ports for actuation of said valve in another direction.

4. A pneumatic hammer comprising in combination, a cylinder provided with a bore, a piston in said bore, a cap on said cylinder having admission ports, a valve box in said cap communicating with said bore and comprising a plurality of juxtaposed sections having ports communicating with said cap admission ports and with the bore, an ejector in said box, and a distributing valve in said box for controlling admission from said box ports to said bore and ejector and projecting into the path of said piston for actuation thereby in one direction.

In witness whereof I have hereunto set my hand in the presence of two witnesses.

CLEMENT HENRY STEVENS.

Witnesses:
 ARTHUR E. EDWARDS,
 D. K. BOYLE.